US008805137B2

(12) United States Patent
McNeilly et al.

(10) Patent No.: US 8,805,137 B2
(45) Date of Patent: Aug. 12, 2014

(54) POSITION SENSOR USING FIBER BRAGG GRATINGS TO MEASURE AXIAL AND ROTATIONAL MOVEMENT

(75) Inventors: Mike McNeilly, Gilbert, AZ (US); Donald Way, Scottsdale, AZ (US)

(73) Assignee: The Cleveland Electric Laboratories Company, Twinsburg, OH (US)

( * ) Notice: Subject to any disclaimer, the term of this patent is extended or adjusted under 35 U.S.C. 154(b) by 0 days.

(21) Appl. No.: 13/584,776

(22) Filed: Aug. 13, 2012

(65) Prior Publication Data

US 2013/0039613 A1    Feb. 14, 2013

Related U.S. Application Data

(60) Provisional application No. 61/522,930, filed on Aug. 12, 2011.

(51) Int. Cl.
*G02B 6/34* (2006.01)
*G02B 6/00* (2006.01)
*G01D 5/353* (2006.01)
*G01L 1/24* (2006.01)

(52) U.S. Cl.
CPC ............ *G01D 5/35316* (2013.01); *G01L 1/246* (2013.01)
USPC ............................................... 385/37; 385/13

(58) Field of Classification Search
USPC .......................................................... 385/13
See application file for complete search history.

(56) References Cited

U.S. PATENT DOCUMENTS 7,628,079 B2 * 12/2009 Sato et al. ........................ 73/761
7,702,190 B2 *  4/2010 Hao et al. ........................ 385/13

* cited by examiner

*Primary Examiner* — Omar Rojas
(74) *Attorney, Agent, or Firm* — Emerson Thomson Bennett, LLC; Roger D. Emerson; Sergey Vernyuk

(57) ABSTRACT

A sensor is disclosed herein. The sensor includes a fiber operable to communicate a light wave. The sensor also includes at least first and second Fiber Bragg Gratings disposed along the fiber. The sensor also includes a structure operable to be Deformed in a plane of deformation. The at least first and second Fiber Bragg Gratings are disposed on opposite sides of the structure in the plane of deformation. The sensor also includes an interrogation unit operable to receive first and second signals corresponding to first and second wavelengths from the at least first and second Fiber Bragg Gratings. The first signal is associated with the first Fiber Bragg Grating and the second signal is associated with the second Fiber Bragg Grating. The sensor also includes a processor operably to derive a difference between the wavelengths of the first and second signals and compare the difference with data correlating wavelength differences to extents of deformation of the structure to yield a current extent of deformation.

14 Claims, 10 Drawing Sheets

POSITION SENSOR USING FIBER BRAGG GRATINGS TO MEASURE AXIAL AND ROTATIONAL MOVEMENT

CROSS-REFERENCE TO RELATED APPLICATIONS

This application claims the benefit of U.S. Provisional Patent Application Ser. No. 61/522,930 for a POSITION SENSOR USING FIBER BRAGG GRATINGS TO MEASURE AXIAL AND ROTATIONAL MOVEMENT, filed on Aug. 12, 2011, which is hereby incorporated by reference in its entirety.

BACKGROUND OF THE INVENTION

1. Field of the Invention
The invention relates to a fiber optic sensor.
2. Description of Related Prior Art
It is known to use sensors to detect strain in a structure.

SUMMARY OF THE INVENTION

In summary, the invention is a sensor. The sensor includes a fiber operable to communicate a light wave. The sensor also includes at least first and second Fiber Bragg Gratings disposed along the fiber. The sensor also includes a structure operable to be deformed in a plane of deformation. The at least first and second Fiber Bragg Gratings are disposed on opposite sides of the structure in the plane of deformation. The sensor also includes an interrogation unit operable to receive first and second signals corresponding to first and second wavelengths from the at least first and second Fiber Bragg Gratings. The first signal is associated with the first Fiber Bragg Grating and the second signal is associated with the second Fiber Bragg Grating. The sensor also includes a processor operable to derive a difference between the wavelengths of the first and second signals and compare the difference with data correlating wavelength differences to extents of deformation of the structure to yield a current extent of deformation.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

The invention, as demonstrated by the exemplary embodiments described below, provides an apparatus and method to measure rotational or linear displacement and temperature using Fiber Bragg Gratings (FBG). In one embodiment, the translation or rotational displacement of a shaft, with an integral wheel and screw, is converted to the bending of a resilient member. The proportional strain (compressive and tensile) induced by the bending can then be measured by two FBGs. In another embodiment, the displacement of a resilient member is induced by a spiral shaft with an integral cam is detected. In various embodiments, the FBGs are fixed to opposing sides of the resilient member such that one experiences tensile strain while the other experiences compressive strain. The design of the exemplary embodiments disclosed below enables accurate displacement measurements while also measuring, and compensating for, any temperature related effects to the sensors.

Figure 1:
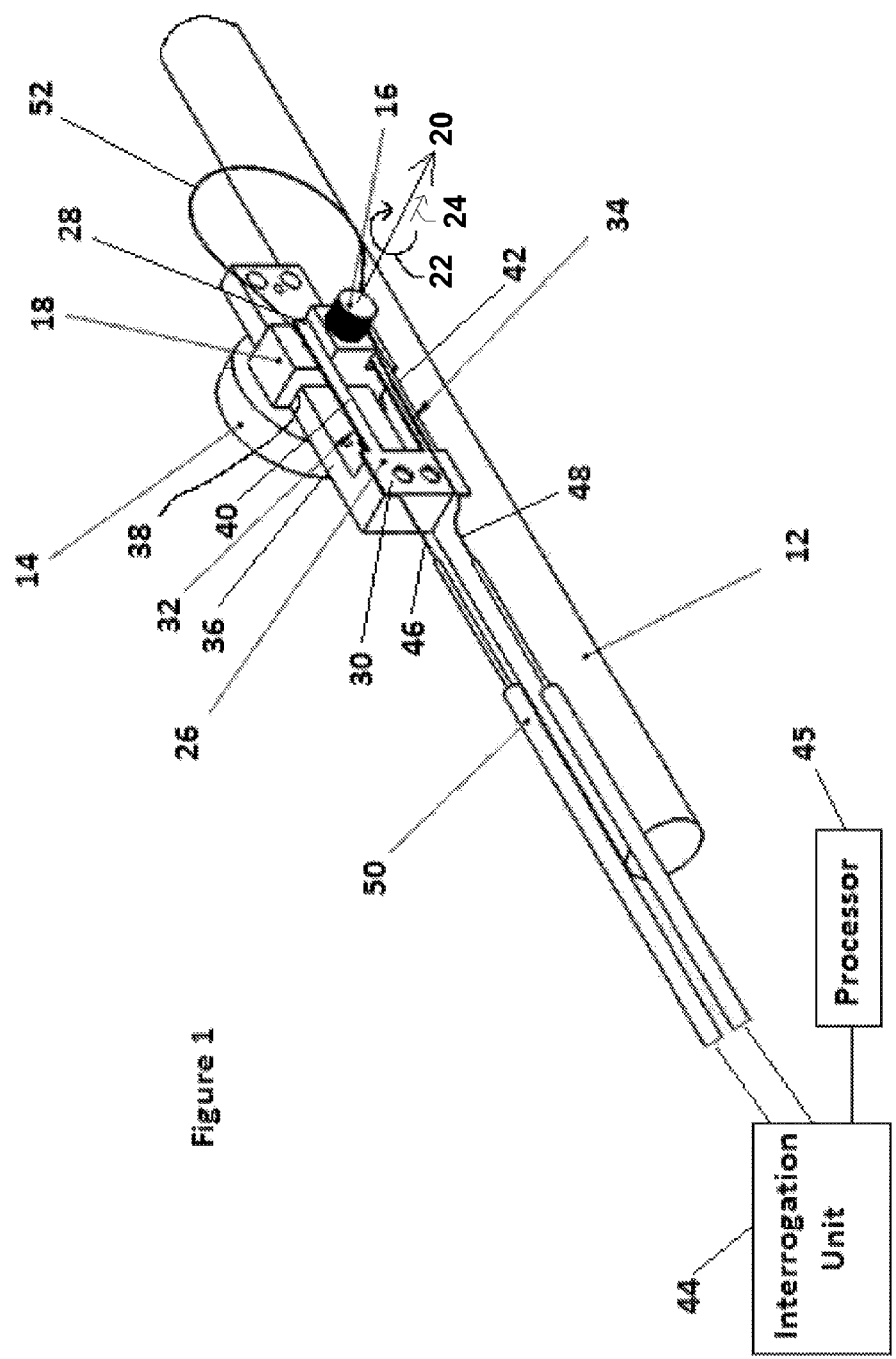
FIG. 1 is a perspective view of a first exemplary embodiment of the invention.

FIG. 1 shows a first exemplary embodiment of the invention. An actuation rod 12 is supported in an outer housing by two linear bearings. The rod 12 contacts a wheel 14 and linear movement of the rod 12 results in rotational movement of the wheel 14. The wheel 14 is fixedly mounted on a threaded axle 16 and movement of the wheel 14 results in movement of the axle 16 as well. As the threaded axle 16 rotates, a forcing block 18, which has threads that mate with the threads of the axle 16, moves along an axis referenced at 20. When the axle 16 rotates in a first angular direction referenced at 22, the block 18 can move in a first direction referenced at 24 along the axis 20. When the axle 16 rotates in a second angular direction opposite to the first angular direction, the block 18 can move in a second direction along the axis 20 opposite to the first direction.

It is noted that the block 18 is generally mounted on a rail 36. The rail 36 is received in a notch 38 defined by the rail 36. Engagement between the notch 38 and the rail 36 limits movement of the block 18 along the axis 20 but does not prevent all movement.

Movement of the forcing block 18 in the first direction 24 imparts a load on a spring member 26. Distal ends (one referenced at 28 and the other hidden) defined by a pair of arms 40, 42 of the spring member 26 are elastically deformed in the first direction 24 relative to a base portion 30 of the spring member 26 when the block 18 moves in the first direction 24. The arms 40, 42 project from the base portion 30. As the forcing block 18 displaces the distal ends of the spring member 26 relative to the base portion 30, strain is created along a length of the spring member 26 between the base portion 30 and the distal ends, in the arms 40, 42.

Two Fiber Bragg Gratings (hereafter FBG) are attached to the spring member 26 to sense conditions that can be electronically communicated, measured, and correlated to the strain in the spring member 26, as well as correlated to the extent of movement of the block 18, the wheel 14, and the rod 12. A first FBG 32 is attached to the first arm 40 of the spring member 26 to sense conditions corresponding to compressive strain. A second FBG 34 is attached to the second arm 42 to measure tensile strain.

The FBGs 32, 34 are in electronic communication with an interrogation unit (referenced schematically at 44) through the fibers 46, 48. An electronic processor 45 can be integral with or separate from the interrogation unit 44. The processor 45 can process the signals received from the FBGs 32, 34. Each fiber 46, 48 is operable to communicate a light wave and each can extend at least partially through a sheath, such as sheath 50. It is noted that the fiber 46, 48 are integral with one another and also with loop portion 52, to define a continuous wave guide. As temperature affects the wavelength of a FBG, it is difficult to differentiate between wavelength change due to physical strain and the change 20 induced by thermal strain. The use of two FBGs in the exemplary embodiment of the invention allows for temperature compensation in strain measurement. By finding the difference between the wavelength changes arising from FBGs 32 and 34, the effect of thermal strains can be cancel, leaving only the strain due to mechanical deformation. The resultant strain is an accurate representation of the true strain in the spring member 26. This strain can then be scaled into the desired engineering units of measure.

Deriving the differential wavelength as set forth above also reveals thermal strain. The "cancelled" portion of strain corresponds to the temperature calibration of either of the FBGs 32 or 34. Thus, the temperature of either FBG 32 or 34 can be calculated by detracting the known mechanical strain. This allows the embodiment of the invention to measure both a position of one of the structural components (derived from strain) and the temperature.

Figure 2:
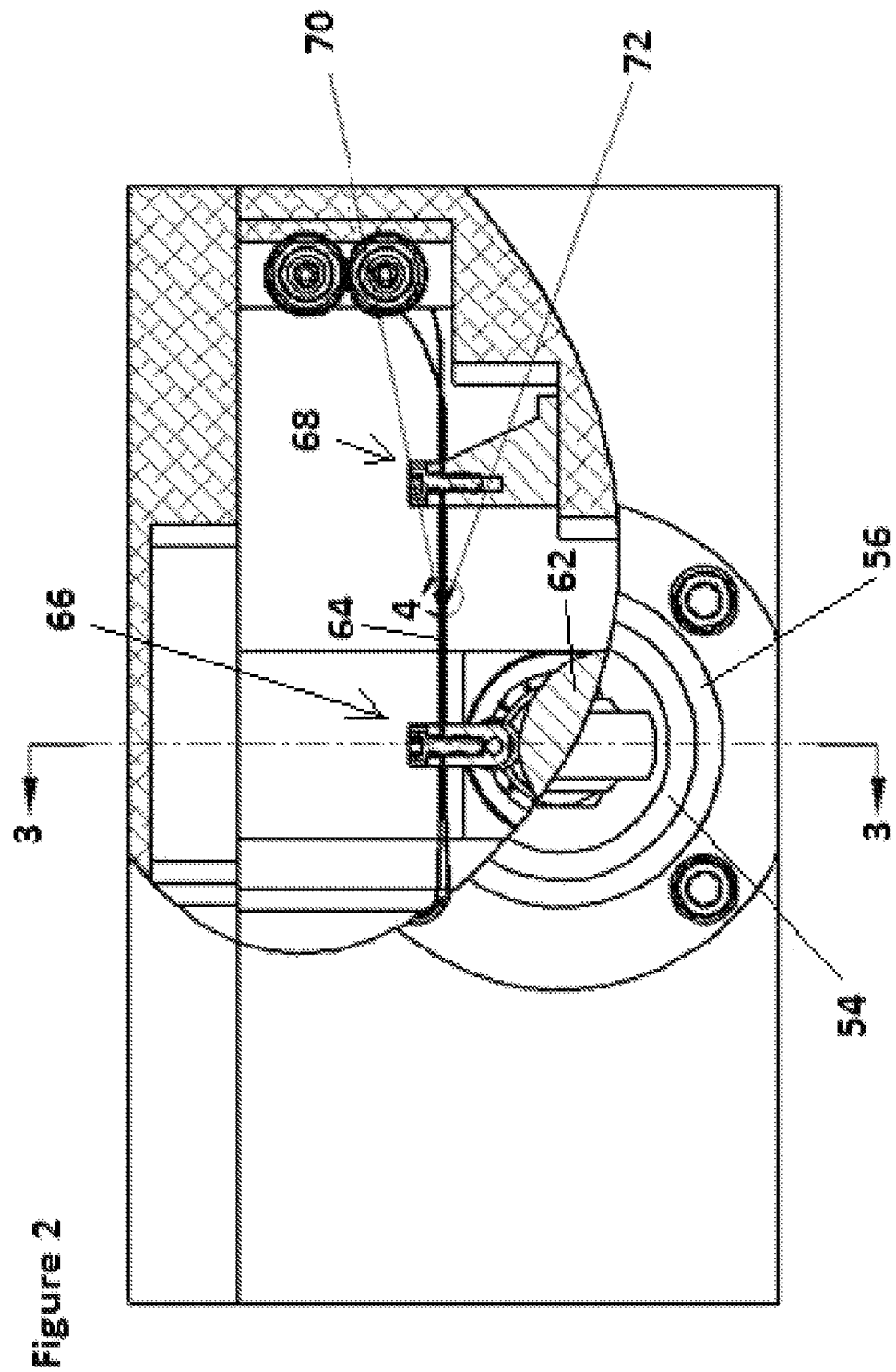
FIG. 2 is a front view of a second exemplary embodiment of the invention with an upper-right portion cut-away.
Figure 3:
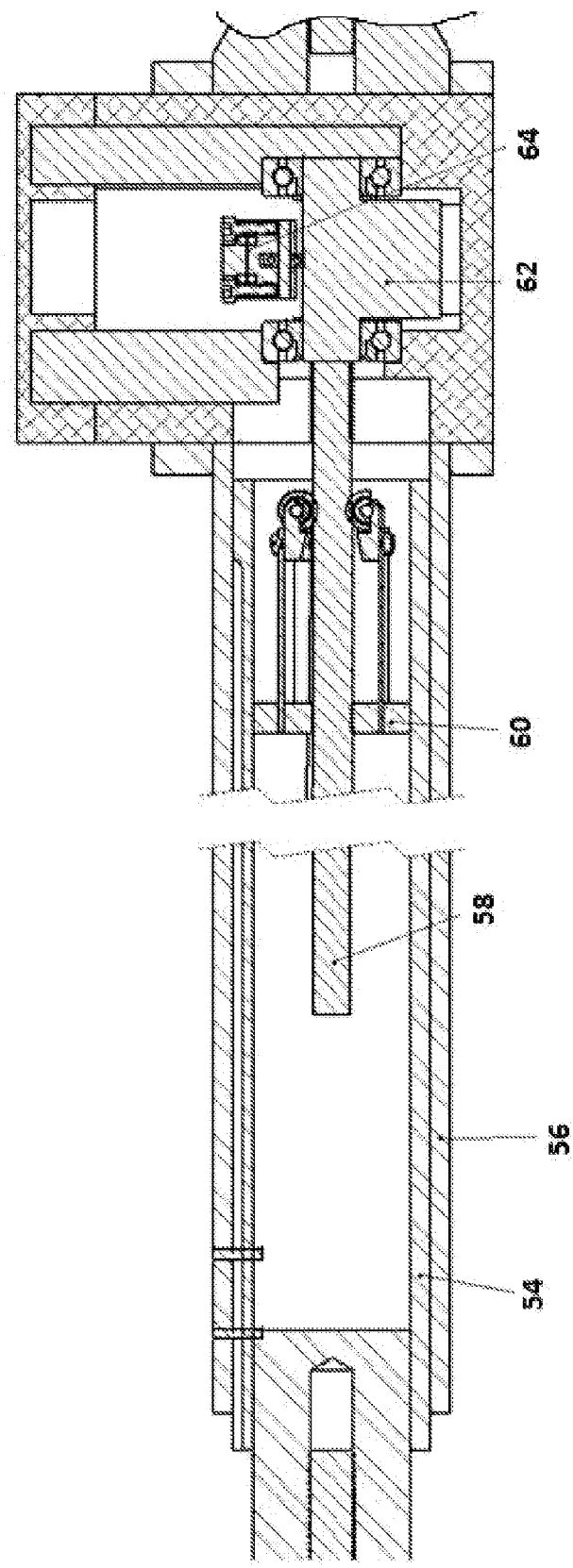
FIG. 3 is a partial cross-section taken through section lines 3-3 in FIG. 2.

FIG. 2 is a planar view of a second embodiment of the invention with a portion cut-away. An actuation tube 54 can be supported by an outer tube 56. The tubes 54, 56 can be concentric. As shown in FIG. 3, internal to the actuation tube 54, two bearings support an internal precision spiral transfer shaft 58. A nut 60 encircles the spiral transfer shaft 58 and is fixed to the actuation tube 54. The nut 60 forces the spiral transfer shaft 58 to rotate in response to linear movement of the actuation tube 54. Rotation of the spiral transfer shaft 58 causes rotational movement of a cam 62. As the cam 62 rotates it applies a load to a spring member 64, causing the spring member 64 to bend. As the cam 62 displaces a tip 66 (referenced in FIG. 2) of the spring member 64, strain is created along a length of the spring member 64 between the tip 66 and a base portion 68.

Figure 4:
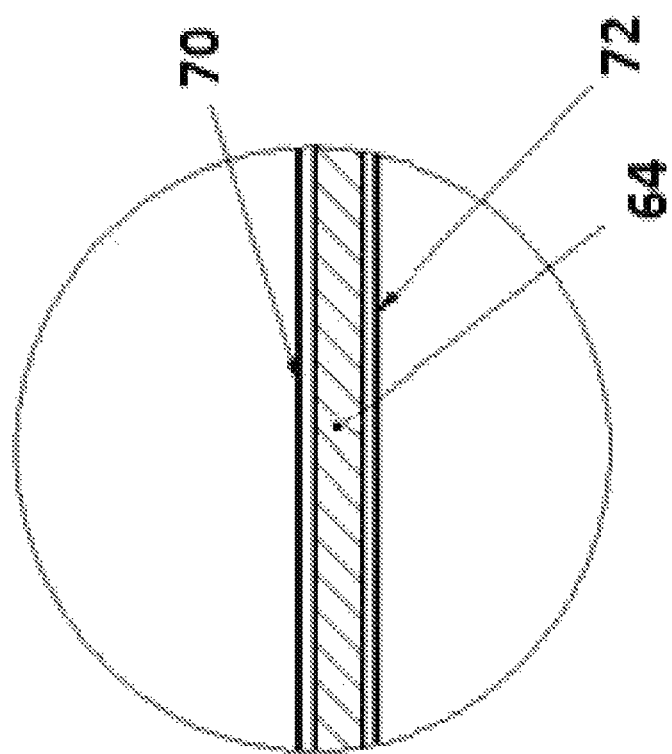
FIG. 4 is a magnified detail view of the detail circle 4 in FIG. 2.

FIG. 4 is taken in a plane of deformation of the spring member 64; the deformation of the spring member 64 is visible in this plane. First and second FBGs 70, 72 are attached to the spring member 64. The first FBG 70 can be attached to a top of the spring member for sensing conditions corresponding to compressive strain as the spring member 64 is deflected away, upward (relative to the perspective of FIG. 2) by the cam 62. The second FBG 72 can be attached to bottom of the spring member 64 to sense conditions corresponding to tensile strain as the spring member 64 is deflected upward by the cam 62.

As with the first embodiment, the FBGs 70, 72 can be connected to an interrogation unit. Also, the operation of the second embodiment is similar to the operation of the first embodiment in that the use of two FBGs allows for temperature compensation in strain measurement. This allows the second embodiment of the invention to measure both position and temperature.

Figure 5:
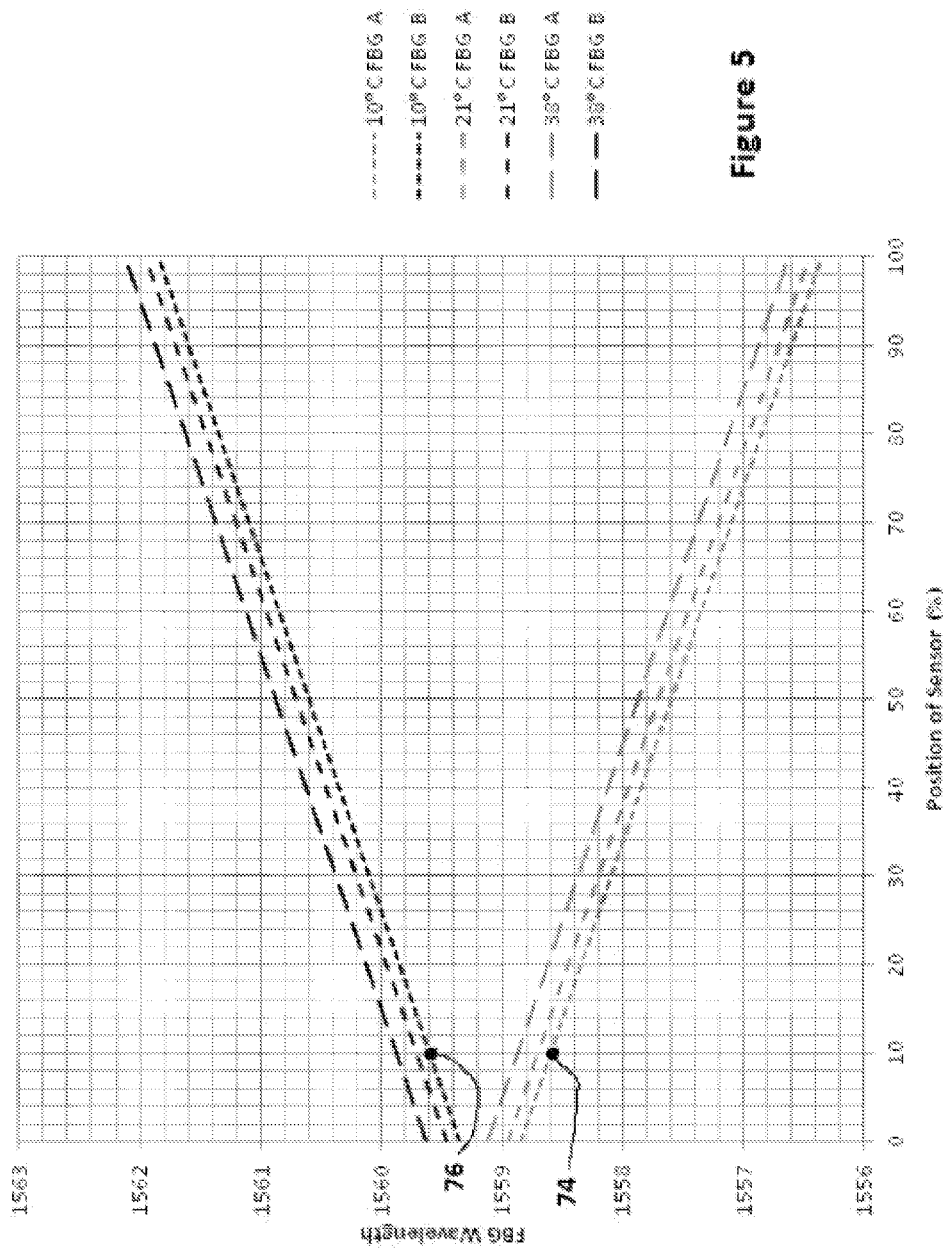
FIG. 5 is a graph correlating output of Fiber Bragg Gratings to temperature.

The method of measuring strain will now be described. In FIG. 5, the outputs of the two FBGs for an embodiment of the invention are shown for three separate temperatures as a function of the sensor position. Each curve (the straight lines in the graph of FIG. 5 are designated herein as curves) represents an extent of deformation of the structure being monitored. The two FBGs are distinguished from one another by the designations "A" and "B." The horizontal axis defines the position of the sensor as a percentage and corresponds to a range over which the spring member is expected to deform in a particular operating environment. In other words, at 50% for example, the spring member will have deformed approximately 50% of the maximum amount the spring member is expected to possibly deform. Thus, the position of sensor is analogous to the extent of deformation of the structure being sensed, a spring member in the exemplary embodiments.

The graph of FIG. 5 reveals that as the temperature of the FBGs increase, the outputs of the FBGs (in wavelength) also increase. Since the common increase in wavelength due to temperature affects the output of both FBGs, taking the difference of the two outputs or taking a ratio of the two outputs allows for a cancelation of thermal effects on the measurement of position change, leaving only the change due to mechanical strain.

Figure 6:
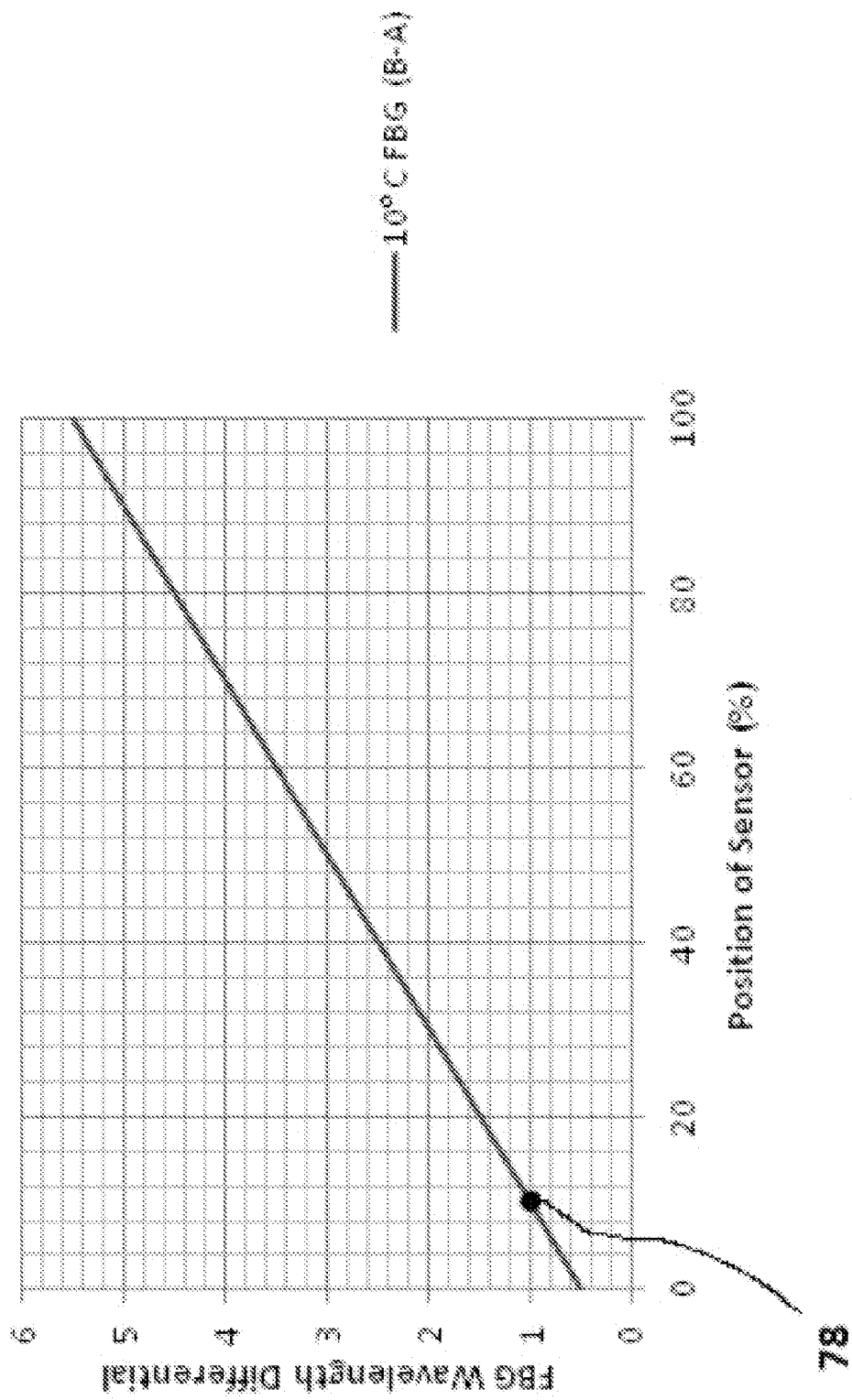
FIG. 6 is a graph displaying the differential output of a plurality of Fiber Bragg Gratings relative to an extent of deformation of a structure at a first temperature.
Figure 7:
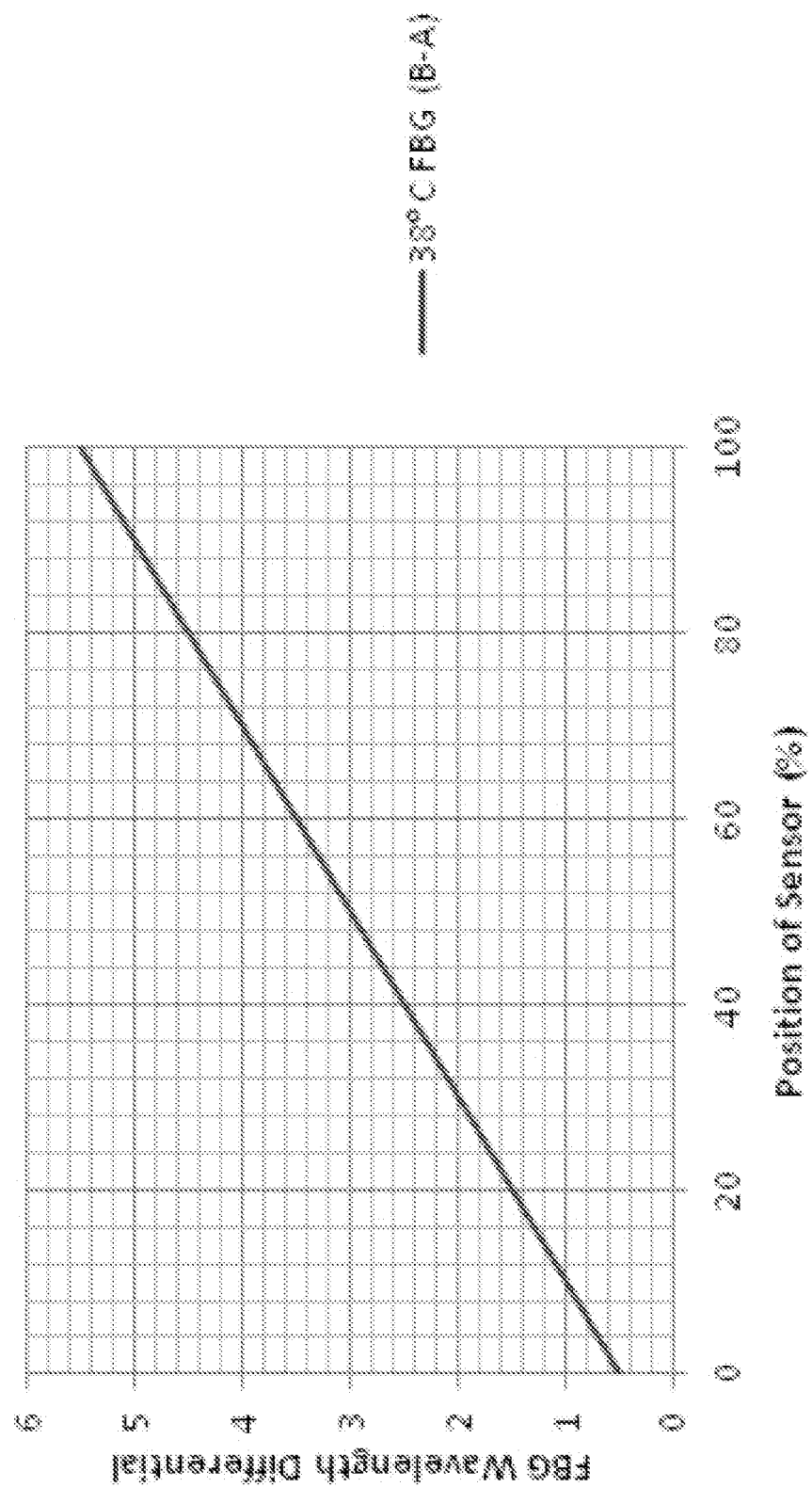
FIG. 7 is a graph displaying the differential output of a plurality of Fiber Bragg Gratings relative to an extent of deformation of a structure at a second temperature.

FIGS. 6 and 7 correlates the difference in wavelengths between FBGs A and B with the position of sensor. FIGS. 6 and 7 also show the difference between exemplary FBGs A and an FBG B when the pairs of FBGs are at two different temperatures. In FIG. 6 the FBGs A and B are at 10° C. and in FIG. 7 the FBGs A and B are at 38° C. A comparison between the two graphs shows that the differential output at different temperatures yields the same position of sensor for either temperature. In other words, the graphs of FIGS. 6 and 7 show that mechanical strain can be accurately determined regardless of temperature.

Figure 8:
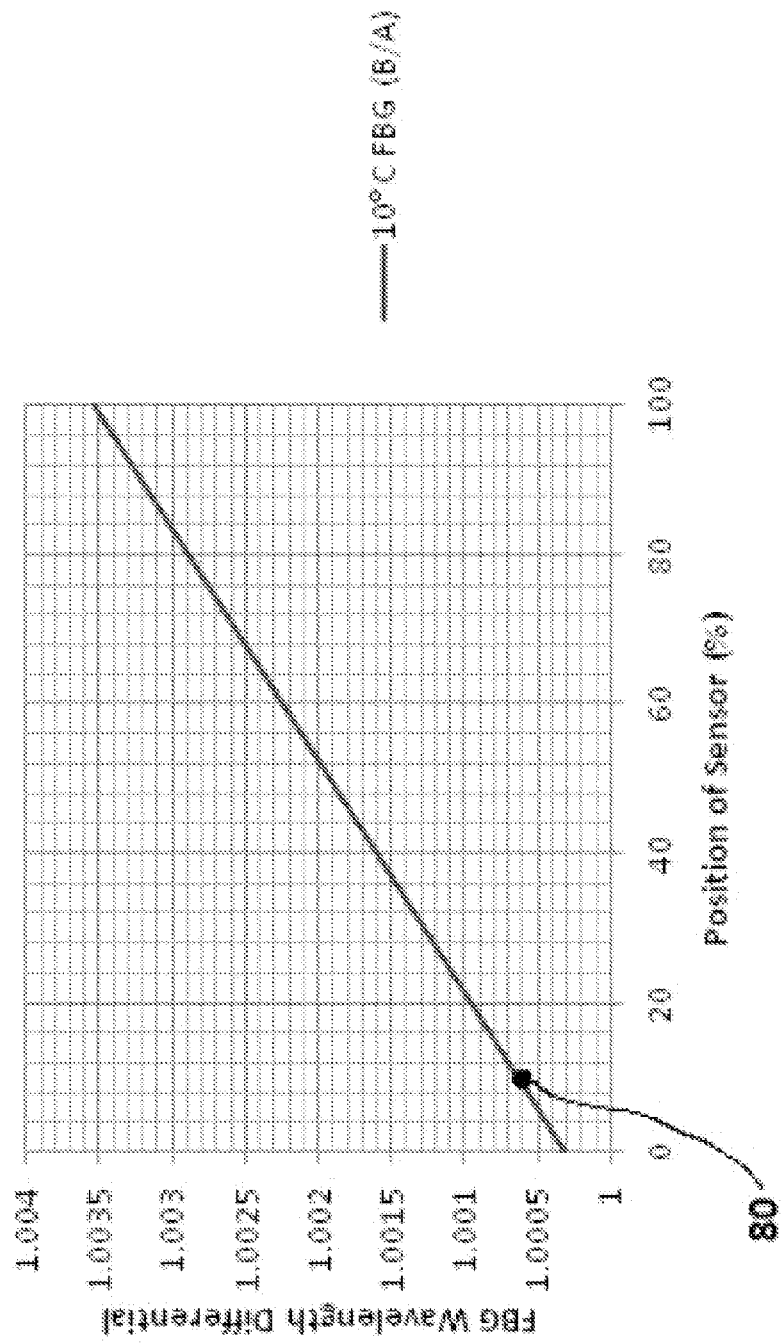
FIG. 8 is a graph displaying the quotient of outputs of a plurality of Fiber Bragg Gratings relative to an extent of deformation of a structure at a first temperature.
Figure 9:
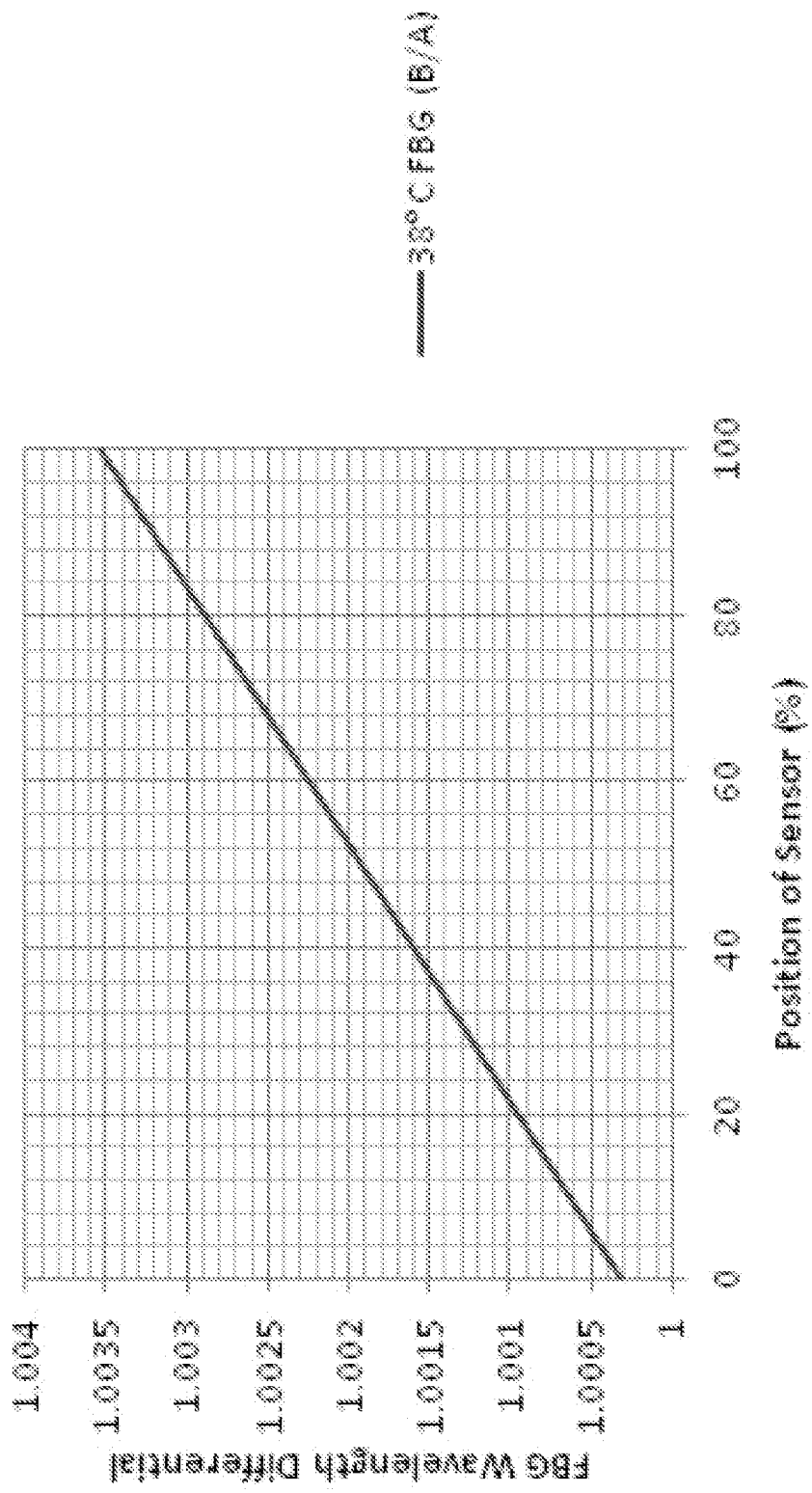
FIG. 9 is a graph displaying the quotient of outputs of a plurality of Fiber Bragg Gratings relative to an extent of deformation of a structure at a second temperature.

FIGS. 8 and 9 are analogous to FIGS. 6 and 7. FIGS. 8 and 9 alternatively show the quotient of a FBG A and a FBG B with at two different temperatures, each FBG having the same temperature. As shown in FIGS. 8 and 9, the calculated difference between the outputs of the FBGs A and B at the different temperatures yields the same position of sensor at either temperature.

EXAMPLE 1

A point 74 referenced on the graph of FIG. 5 corresponds to the FBG A at 10° C. and at 10% of the position of sensor. A point 76 referenced on the graph of FIG. 5 corresponds to the FBG B at 10° C. and at 10% of the position of sensor. The coordinates of point 74 are (10%, 1558.6 nanometers) and the coordinates of point 76 are (10%, 1559.6 nanometers). The vertical, differential distance between points 74 and 76 is 1 nanometer. This value is confirmed by reference to FIG. 6, in which coordinates of point 78 are (10%, 1 nanometer). The quotient of the wavelength values (1559.6 divided by 1558.6) is equal to 1.0006. This value is confirmed by reference to FIG. 8, in which coordinates of point 80 are (10%, 1.0006).

It is noted that the value of the position of sensor would be the value being pursued. After the differential wavelength or quotient is known, FIG. 6 or 8 would be consulted to derive the position of sensor. In an embodiment of the invention, the data graphically shown in FIGS. 6 and 8 could be in the form of a table stored in the memory of an electronic processor. An electronic processor can receive the signal inputs from the FBGs, determine the differential wavelength and/or quotient, access a table of data analogous to the data in FIG. 6 or 8, and obtain the position of sensor. An electronic processor in an embodiment of the invention can be component of the interrogation unit.

Figure 10:
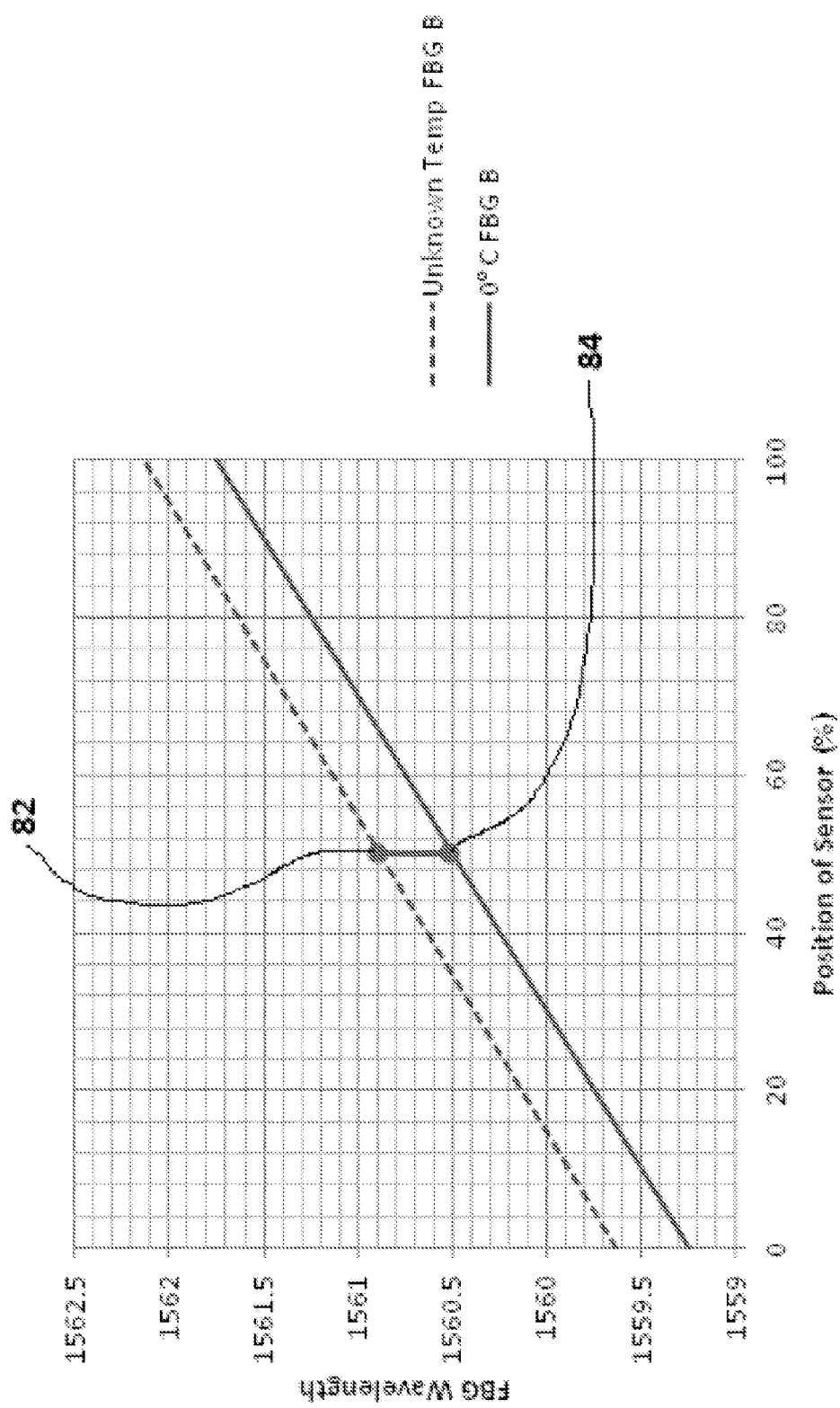
FIG. 10 is a graph displaying the wavelength of outputs of a Fiber Bragg Grating relative to an extent of deformation, with curves for current temperature and for a reference or known temperature.

Once the position of the sensor is calculated the temperature of the sensor can be determined. The measured output of one of the FBGs at the known position can be referenced against known output for a FBG at the same position and at a known temperature. The dashed line in FIG. 10 represents the output of an FBG at an unknown temperature. The solid line in FIG. 10 represents the output of an FBG at a known temperature. Data associated with FBG output at one or more known temperatures can be stored as data in an electronic processor that receives and processes signals from the FBGs. FIG. 5 shows a plurality of curves/lines representing observed FBG output at various temperatures; an electronic processor can retain such data in memory.

EXAMPLE 2

The observed output of an FBG is referenced at point 82 in FIG. 10. It has been previously determined that the position of sensor is 50%. Several alternative methods can be applied to derive the temperature of the FBG. In one embodiment of the invention, the vertical position of the point 82 relative to other, known curves can be the basis of interpolation. For example, if the point 82 were vertically equidistant between a curve associated with 0° C. and a curve associated with 20° C., the temperature of the FBG could be determined to be 10° C. if the relationship between the 0° C. curve and the 20° C. curve was known to be parallel. Alternatively, the difference in wavelength can correspond directly to the temperature difference. In FIG. 10, the point 82 is approximately 0.4 nanometers vertically distance from a point 84 on 0° C. curve. In an embodiment of the invention, the distance 0.4 nanometers can correspond to a 40° C. temperature difference. The FBG operating at point 82 would thus be operating at a temperature of 40° C.

Embodiments of the invention can be applied to methods and apparatus related to monitoring the position and temperature of mechanical components such as, by way of example and not limitation, variable valve positions, actuator stroke length, flow control devices, inlet guide vane positions, automation feedback loops, thermal growth of structures, gate position and component deflection.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A sensor comprising:
    a fiber operable to communicate a light wave;
    at least first and second Fiber Bragg Gratings disposed along said fiber;
    a structure operable to be deformed in a plane of deformation, wherein said at least first and second Fiber Bragg Gratings are disposed on opposite sides of said structure in said plane of deformation;
    a threaded forcing block operable to deform the structure along the plane of deformation;
    an interrogation unit operable to receive first and second signals corresponding to first and second wavelengths from said at least first and second Fiber Bragg Gratings, wherein the first signal is associated with the first Fiber Bragg Grating and the second signal is associated with the second Fiber Bragg Grating; and
    a processor operable to derive a difference between the wavelengths of the first and second signals and compare the difference with data correlating wavelength differences to extents of deformation of the structure to yield a current extent of deformation.

2. The sensor of claim 1 wherein said structure is further defined as a spring member having at least one substantially straight arm portion.

3. The sensor of claim 2 wherein said spring member is further defined as having first and second substantially straight arm portions extending parallel to one another.

4. The sensor of claim 3 wherein one of said Fiber Bragg Gratings is disposed on said first arm portion and the other of said Fiber Bragg Gratings is disposed on said second arm portion.

5. The sensor of claim 4 wherein said first and second arm portions extend respective first and second lengths between a base portion and respective distal ends and are spaced from each other along at least part of said respective first and second lengths.

6. The sensor apparatus of claim 2 wherein said spring member is further defined as having only a single substantially straight arm portion.

7. A method of sensing comprising the steps of:
    directing light through a fiber and first and second Fiber Bragg Gratings disposed along the fiber;
    disposing the fiber on a structure operable to deform such that the first and second Fiber Bragg Gratings are positioned on opposite sides of the structure relative to a plane of deformation of the structure;
    deforming the structure along the plane of deformation by a threaded forcing block;
    receiving with an interrogation unit first and second signals each corresponding to a wavelength, wherein the first signal is associated with the first Fiber Bragg Grating and the second signal is associated with the second Fiber Bragg Grating;
    deriving with a processor the difference between the wavelengths of the first and second signals; and
    comparing with the processor the difference derived in said deriving step with first data correlating wavelength differences and extents of deformation of the structure to yield a current extent of deformation of the structure.

8. The method of claim 7 further comprising the step of:
    comparing with the processor the current extent of deformation with second data correlating extents of deformation and wavelengths for a plurality of discrete temperatures.

9. The method of claim 8 further comprising the step of:
    deriving with the processor a current temperature of the structure with the second data by interpolating between first and second different wavelengths both at the current extent of deformation and at first and second different temperatures based on one of the first and second signals.

10. The method of claim 8 further comprising the step of:
    deriving with the processor a current temperature of the structure with the second data by determining the difference between the wavelength of one of the first and second signals, at the current extent of deformation, and wavelength for a plurality of discrete temperatures at the current extent of deformation.

11. The sensor of claim 5 wherein the first and second arm portions are substantially coplanar and substantially perpendicular to the plane of deformation.

12. The sensor of claim 1 further comprising:
a threaded axle, where the threads of the axle mate with the threads of the forcing block; and
a wheel that is fixedly mounted on the axle such that movement of the wheel causes movement of the axle;
wherein movement of the axle in a first angular direction causes movement of the forcing block in a third direction, and wherein movement of the axle in a second angular direction causes movement of the forcing block in a fourth direction; wherein the first and second angular directions are opposite to each other, and wherein the third and fourth directions are opposite to each other.

13. The sensor of claim 12 further comprising a rail, wherein the forcing block is mounted on the rail such that the rail limits movement of the forcing block along the axis of the third and fourth directions.

14. The sensor of claim 13 further comprising a rod that is supported by at least one bearing and contacting the wheel, wherein linear movement of the rod causes rotational movement of the wheel.

* * * * *